2,888,469
14α-HYDROXYPROGESTERONES

Eugene L. Dulaney, Saskatoon, Saskatchewan, Canada, and William J. McAleer, Roselle, N.J., assignors to Merck & Co., Inc., Rahway, N.J., a corporation of New Jersey No Drawing. Application December 27, 1955
Serial No. 555,276

8 Claims. (Cl. 260—397.3)

This invention relates to novel steroids and particularly to 14α-hydroxy-progesterones and derivatives thereof.

The compounds of the present invention are compounds having the following structural formulae:

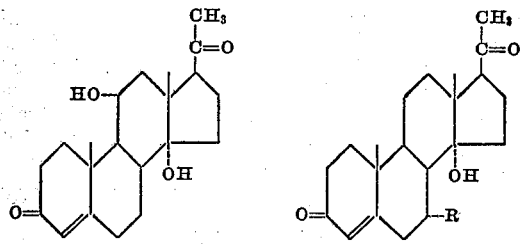

wherein R is a hydroxy group, keto group (=O), or an acyloxy group having the formula

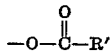

wherein R' is a hydrocarbon group and preferably having less than nine carbon atoms. These compounds have cortisone-like activity and therefore can be compounded and used in a manner similar to cortisone.

In accordance with the invention, progesterone is subjected to a fermentation process by means of an oxygenating strain of *Curvularia lunata* (NRRL–2474) to produce 4-pregnene-11β,14α-diol-3,20-dione and 4-pregnene-7α,14α-diol-3,20-dione. The 7-acyloxy derivatives of 4-pregnene-7α,14α-diol-3,20-dione are prepared by reacting with an acylating agent. The 7-hydroxy compound can be reacted with an oxidizing agent to produce the corresponding 7-keto compound.

The fermentation of progesterone to produce the 14α-hydroxyprogesterones is conveniently carried out by subjecting progesterone to the action of an oxygenating enzyme produced by growing an oxygenating strain of *Curvularia lunata* (NRRL–2474). This is accomplished by growing the microorganism under aerobic conditions in a suitable nutrient medium in intimate contact with the progesterone; the culturing growth of the microorganism being continued until the oxygenation has occurred.

The progesterone can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the progesterone be present in very finely divided form in order to permit maximum contact with the oxygenating culture medium and insure completion of the reaction. All of the progesterone can be added at one time or the addition can be continuous or intermittent over a period of time.

The process can be effected in both stationary and submerged culture of *Curvularia lunata* (NRRL–2474) under aerobic conditions, although for practical purposes it is most conveniently carried out by growing the microorganism under submerged conditions in a suitable aqueous fermentation medium containing the progesterone. The amount of the progesterone which can be conveniently oxygenated, will depend in part upon the particular medium employed.

Aqueous nutrient mediums suitable for the growing of oxygenating strains of the microorganisms must contain sources of assimilable carbon and nitrogen as well as minor amounts of inorganic salts. Any of the usual sources of assimilable carbon such as dextrose, cerelose, glucose, inverted molasses and the like employed in fermentation mediums can be used in carrying out the process of our invention. Similarly, complex sources of nitrogen usually employed in commercial fermentation process such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts, such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The additon of minor amounts of antifoaming agents, although not essential, is desirable with some fermentation mediums. It has been found that the addition to certain fermentation mediums of a substituted oxazoline which is a nonvolatile, amine-type, cationic surface active agent available under the trade name Alkaterge C is particularly effective in reducing the amount of foam, although other anti-foam agents known to be useful for this purpose can also be used.

When the oxygenation is complete, the oxygenated progesterones can be recovered from the fermentation broth by extraction with a suitable water immiscible organic solvent for the oxygenated steroids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired products which can be further purified, separated by fractional crystallization or other procedures conventional in the art.

The corresponding 7-acyloxy derivatives of the 4-pregnene-7α,14α-diol-3,20-dione are prepared by reacting with a suitable acylating agent such as a carboxylic acid halide, ester, ketone or anhydride in a suitable solvent medium. This acylation can be achieved in organic bases such as pyridine and alkyl derivatives thereof, tertiary bases such as dialkyl anilines, quinolines and trialkyl amines. It is preferred, to use the appropriate carboxylic acid anhydride in pyridine. The esterification of the 7-hydroxy group is conveniently accomplished by effecting the reaction at ordinary temperatures in from about one-half to three hours. After the reaction is complete, the desired ester is readily recovered by diluting the reaction mixture with water and filtering the product which separates. Representative 7-acyloxy derivatives of 4-pregnene-7α,14α-diol-3,20 dione which can thus be prepared are those derivatives from carboxylic acid containing less than nine carbon atoms which are saturated or unsaturated aliphatic, or carbocyclic, cycloaliphatic, aryl, alkaryl, mono, di or poly-carboxylic acids, such as formyloxy, acetoxy, propionyloxy, butyryloxy, valeryloxy, hexanolyoxy, heptanoyloxy, octanoyloxy, benzoxy, phenylacetoxy, tolyloxy, cyclopentylformyloxy, β-cyclopentylopropionoxy, acryіyloxy, cyclohexanoyloxy, and those formed with malonic, maleic, succinic, glutaric, adipic acids and the like.

The 4-pregnene-7α,14α-diol-3,20-dione is converted to 4-pregnene-14α-ol-3,7,20-trione by treating with an oxidizing agent. Any of the conventional oxidizing agents can be used. Typical examples of suitable oxidizing agents are aluminum tertiary butoxide in the presence of a lower ketone such as acetone, dichromate such as sodium dichromate in acetic acid, and hexavalent chromium, such as chromic acid or chromyl chloride, pyridine chromate, permanganates, the peroxides such as benzo-peracid, phthalic mono-peracid or hydrogen peroxide, advantageously in the presence of osmium tetroxide. The oxidation is most conveniently carried out at room temperature (20–30° C.) and at which temperature it requires from one to twelve hours for completion. The product can be recovered by conventional procedures such as extracting with a solvent such as ethyl acetate and removing the solvent to crystallize the product.

The 4-pregnene-7α,14α-diol-3,20-dione can be dehydrated to form the corresponding 4,6-pregnadiene and 4,6,8(14)-pregnatriene compounds by reacting with a dehydrating agent. Suitable dehydrating agents are concentrated organic or inorganic acids or their anhydrides, for example fatty acids, hydrohalic acides, and phosphorous pentoxide, or inorganic salts, for example zinc chloride or potassium bisulfate, and also catalytically active agents, such as iodine in the presence or absence of diluents. The employment of lower organic fatty acids, such as acetic acid, propionic acid, butyric acid and so on, is particularly advantageous. The dehydration can be carried out in the presence of a solvent such as the lower alcohols or ketones as for example methanol, ethanol, propanol, acetone, methyl ethyl ketone and the like. The reaction is preferably carried out at the reflux temperature of the mixture but higher and lower temperatures can be used. The reaction usually requires from one-half to four hours. The product can be recovered by conventional procedures such as extracting with an organic solvent such as an aromatic hydrocarbon and evaporating to dryness. The pregnadiene and pregnatriene can be hydrogenated and then esterified to form the corresponding 3-acylates which are known compounds useful as intermediates for producing compounds having cortisone-like activity.

The following examples are given for the purposes of illustration:

EXAMPLE 1

Approximately 21 liters of a culture medium having the composition as follows:

| | Grams |
|---|---|
| Commercial dextrose (cerelose) | 50.0 |
| Commercial lactalbumin digest (Edamine) | 20.0 |
| Corn steep liquor | 5.0 |

Distilled water is added to give a total volume of one liter of nutrient medium and the pH adjusted to 6.5 with sodium hydroxide.

is sterilized for thirty minutes at 100° C. The medium is then inoculated with a growth of *Curvularia lunata* NRRL–2474. The mixture is then agitated using a two turbo agitator at 408 r.p.m. and air is passed in at a rate of two liters per minute for approximately 24 hours while maintaining the temperature at 28° C. At the end of the 24 hour period approximately 16 mg. per liter per hour of progesterone dissolved in propylene glycol is added until a total of 9 grams had been added to the fermented medium and agitation and aeration continued at the same rate for an additional 24 hours. The resulting broth is filtered, and the cells reserved for further treatment, and concentrated to three liters by evaporating to 50° C. Both the mycelia and broth are extracted with three portions of n-propyl acetate. The combined extracts are concentrated in vacuo to yield a viscous red oil. The red oil was partitioned between petroleum ether (3 x 1 liter) and 70% aqueous methanol (1 liter). The aqueous methanol layer was concentrated in vacuo to remove the methanol and the aqueous residue was extracted with ethyl acetate. The ethyl acetate solution was evaporated (in vacuo) to a viscous oil which upon treatment with a small volume of ethyl acetate deposited a pale yellow crystalline solid. A similar crop was obtained by allowing the ethyl acetate to evaporate slowly at room temperature. Recrystallization of a portion of the isolated material from an ethyl acetate-acetone mixture yielded while crystalline 4-pregnene-7α,14α-diol-3,20-dione which in the hot stage sublimed from 260–280° C. and melted at 280° C.

U.V. spectrum $\lambda_{Maximum}^{Methanol}$ 2420 A., E%=450

Spectrum in concentrated sulfuric acid 2860 A., 3200 A., 3640 A., 4600 A. Negative tetrazolium test.

EXAMPLE 2

The 4-pregnene-7α,14α-diol-3,20-dione (68.3 mg.) prepared in Example 1 is reacted with 4.5 ml. of acetic anhydride in 4.5 ml. anhydrous pyridine for a period of twelve hours at 23° C. The product which is the 7-acetoxy derivative of 4-pregnene-7α,14α-diol-3,20-dione is recovered from the reaction mixture by the addition of ice water, extracting with ethyl acetate, washing with 0.5 N hydrochloric acid and then water. The ethyl acetate layer was evaporated to a small volume and stored at 0° C. A crop of white needle-crystals was obtained which were than washed twice with ether and then dried at 100° C. in vacuo for several hours.

U.V. $\lambda_{Maximum}^{Methanol}$ 2385 A., E%=535, melting point 227–235°C.

EXAMPLE 3

In the same manner as described in Example 1 progesterone was added to a growing culture of *Curvularia lunata* (NRRL–2474). Aeration and agitation was continued for 24 hours. The fermented medium containing the steroidal products was filtered to remove mycelial growth and the filtrate exhaustively extracted with ethyl acetate. The extracts were combined and concentrated in vacuo. The residual concentrate was chromatographed on a column of neutral alumina. A mixture of two 14α-hydroxyprogestrones was eluted from the column with a mixture one part of ether and three parts of chloroform. Removal of the solvent mixture by concentration and fractional crystallization effected separation of two crystalline dihydroxyprogesterones. One of these compounds was identical with the product produced in Example 1 (4-pregnene-7α,14α-diol-3,20-dione).

$\lambda_{Maximum}^{Methanol}$ 2420 A., E%=450, $[\alpha]_D^{24}$=+177° (C=0.5, methanol)

Treatment of this material with a solution of 0.5% potassium hydroxide in methanol at 25° C. for approximately 16 hours produced 4,6-pregnadiene-14α-ol-3,20-dione $\lambda_{Maximum}^{Methanol}$ 2380 A.

4,6-pregnadiene-14α-ol-3,20-dione (50 mg.) and fused potassium acid sulfate (50 mg.) were added to 3.0 ml. glacial acetic acid and heated on the steam bath for fifteen minutes. The U.V. spectrum indicated incomplete dehydration. Therefore three drops of concentrated hydrochloric acid were added and the mixture was heated another two hours. Ultraviolet analysis of an aliquot of the reaction mixture showed the product of the reaction to be 4,6,8(14)-pregnatriene-3,20-dione.

$\lambda_{Max.}^{MeOH}$ 3450 A.

The 4,6-pregnadiene (328 mg.) was hydrogenated over 50 mg. of platinum dioxide in 20 ml. of methanol to produce 4-pregnene-14α-ol-3,20-dione. The hydrogenation was non-specific, 1.44 mole equivalent of hydrogen being taken up in five minutes.

U.V. $\lambda_{Max.}^{MeOH}$ 2420 A., E% 179; 2830 A., E% 168

This mixture of dienone, -enone, and more highly saturated products was chromatographed on a two-phase partition column of 100 gram Whatman cellulose powder, standard grade, moistened with formamide-methanol (1:1). The hydrogenation product was applied to the column in benzene solution and the column was developed with benzene. Fractions 10 through 16, rich in material absorbing at 2420 A., were further purified by chromatography on paper in benzene-formamide methanol (1:1) systems. Bands with a mobility slightly greater than the starting material were eluted with methanol. The steroid obtained by concentration of the eluate was twice recrystallized from benzene to yield white crystals of 14α-hydroxyprogesterone, melting point 195–198° C. (on the hot-stage) $[\alpha]_D^{30}$ +172° (C=0.4, C.H.F.);

U.V.$\lambda_{Max.}^{MeOH}$ 2420 A., E% 375, no other U.V. absorption

The 4-pregnene-11β,14α-diol-3,20-dione has the following physical characteristics:

$\lambda_{Max.}^{MeOH}$ 2410 A., E% 468; $\lambda_{Max.}^{H_2SO_4}$ 2830, 4720 A.; $[\alpha]_D^{24}$ +211° (C=1, methanol)

melting point 224–229° C. This compound is stable to alkali and cannot be easily acetylated. It is readily oxidized with sodium dichromate to 4-pregnene-11β-ol-3,14,20-trione.

Any departure from the above description which conforms to the present invention is intended to be included within the scope of the claims.

What is claimed is:
1. A compound having the formula—

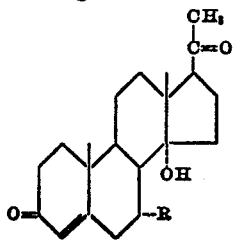

wherein R is selected from the group consisting of a hydroxy group, a keto group and

wherein R' is a hydrocarbon group containing less than nine carbon atoms.

2. 4-pregnene-11β,14α-diol-3,20-dione.
3. 4-pregnene-7α,14α-diol-3,20-dione.
4. 4-pregnene-14α-ol-3,7,20-trione.
5. A compound having the formula—

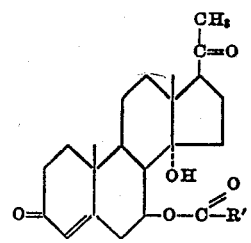

wherein R' is a hydrocarbon group containing less than nine carbon atoms.

6. The 7-acetate of 4-pregnene-7α,14α-diol-3,20-dione.
7. 4,6-pregnadiene-14α-ol-3,20-dione.
8. 4,6,8(14)-pregnatrien-3,20-dione.

References Cited in the file of this patent
UNITED STATES PATENTS

| | | |
|---|---|---|
| 2,602,769 | Murray | July 8, 1952 |
| 2,658,023 | Shull | Nov. 3, 1953 |
| 2,666,016 | Hechter | Jan. 12, 1954 |
| 2,702,809 | Murray | Feb. 22, 1955 |
| 2,702,810 | Murray | Feb. 22, 1955 |
| 2,702,812 | Shull | Feb. 22, 1955 |
| 2,756,179 | Fried et al. | July 24, 1956 |